March 24, 1931.  D. J. HUGHES  1,797,660
TRACTOR HITCH
Filed Dec. 6, 1929   2 Sheets-Sheet 2
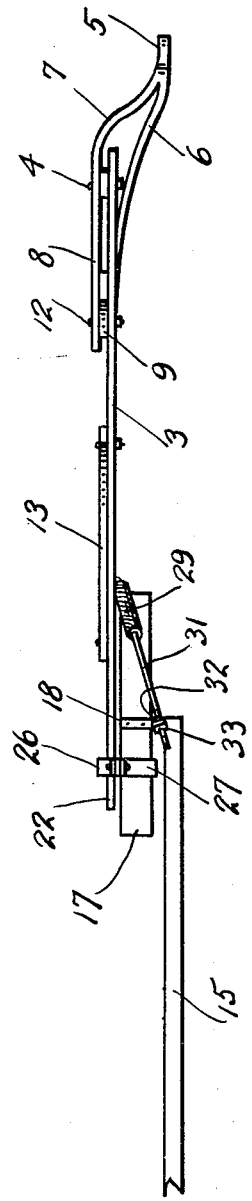
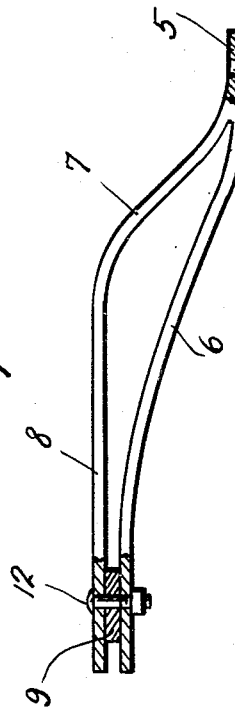
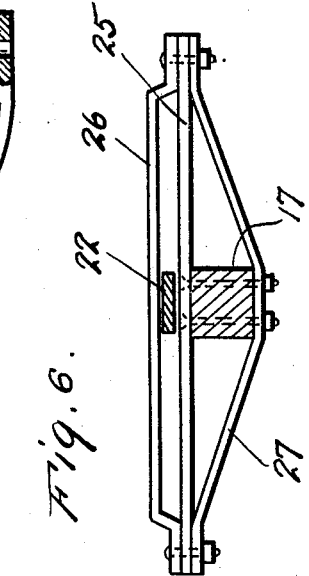
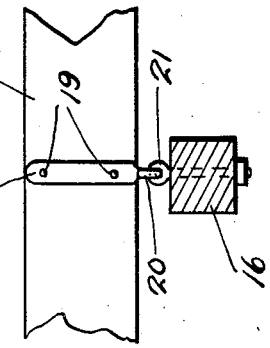
Inventor
*Dallas J. Hughes*
By *Clarence A. O'Brien*
Attorney Patented Mar. 24, 1931

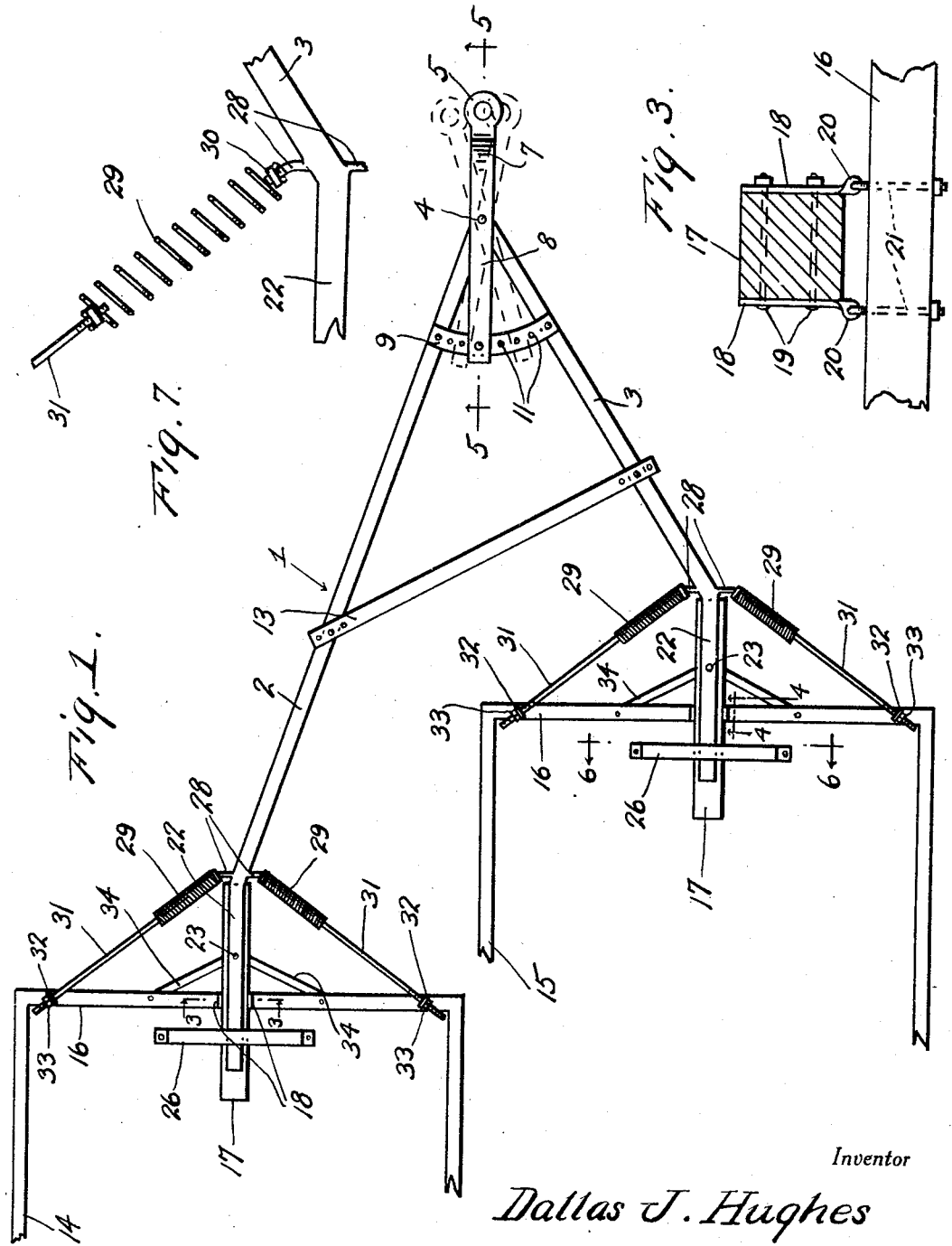

1,797,660

UNITED STATES PATENT OFFICE

DALLAS J. HUGHES, OF ALBION, WASHINGTON

TRACTOR HITCH

Application filed December 6, 1929. Serial No. 412,073.

This invention relates to a tractor hitch and more particularly to a device of this character which is adapted for use in coupling a pair of grain drills to a tractor but it is to be understood that a hitch construction in accordance with this invention may be utilized for any purpose for which same is found adaptable.

An important object of the invention is to provide, in a manner as hereinafter set forth, the tractor hitch of the aforementioned character which embodies means whereby a pair of grain drills may be disposed in overlapping relation longitudinally with respect to each other in order that all of the ground traversed thereby will be planted and whereby the extent of the overlapping may be expeditiously regulated as desired.

Another important object of the invention is to provide a coupling mechanism between the hitch and the grain drills which will permit of a certain amount of play of said drills with respect to the hitch in order to compensate for irregularities which may occur in the ground over which the machine travels.

Other objects of the invention are to provide a tractor hitch of the aforementioned character which will be simple in construction strong, durable, efficient in its use, and which may be manufactured at low cost.

Other objects and advantages of the invention will become apparent after a study of the following specification, taken in connection with the accompanying drawings, wherein like characters of reference designate corresponding parts throughout the several views, and wherein:—

Figure 1 is a view in top plan of a tractor hitch constructed in accordance with this invention, the same being shown coupled to a pair of grain drills, the frame portion only of which is shown.

Fig. 2 is a side elevation of the invention.

Fig. 3 is a fragmentary view in cross section taken substantially on the line 3—3 of Fig. 1.

Fig. 4 is a sectional view taken substantially on the line 4—4 of Fig. 1 and looking in the direction of the arrows.

Fig. 5 is a detail view in side elevation and partly broken away in section on substantially the line 5—5 of Fig. 1 and looking in the direction of the arrows, said view illustrating the coupling means for securing the hitch to the tractor.

Fig. 6 is a cross section taken substantially on the line 6—6 of Fig. 1, and looking in the direction of the arrows.

Fig. 7 is a fragmentary detail view in top plan illustrating one of the resilient coil springs which automatically maintain the drills in proper alinement.

Referring to the drawings in detail, the reference character 1 designates generally the hitch which includes a pair of rearwardly diverging bars or legs 2 and 3 which have their forward ends pivotally connected together through the medium of the bolt 4.

As best illustrated in Fig. 1 of the drawing the bar 2 is of considerably greater length than the bar 3.

The frame 1 is adjustably connected to the tractor through the medium of a metallic draw bar which includes an eye 5 which is adapted for the passage of the coupling pin on the tractor and from which extends a pair of arms 6 and 7, the latter being provided with a horizontally disposed portion 8 which extends in a horizontal plane over the forward end portion of the frame 1, and intersect the arcuate metallic strap 9 which extends between the bars 2 and 3.

The arm 7 is pivotally secured to the forward end of the frame 1 through the medium of the bolt 4 which extends therethrough. The lower arm 6 extends beneath the frame 1 and intersects the strap 9 on its lower side, and as best seen in Fig. 5, said arms 6 and 7 embrace said strap therebetween.

The strap 9 is provided with a series of openings 11 through which a securing bolt 12 which extends transversely through the rear end portion of the arms 6 and 7 is adapted to be selectively inserted for adjusting the draw bar with respect to the frame. The diagonally extending cross brace 13 has its opposite end portion adjustably secured to intermediate portions of the bars 2 and 3.

The reference numeral 14 designates the forward portion of a grain drill which is attached to the bar 2, and 15 designates the forward portion of another grain drill attached to the bar 3. The construction and arrangement of parts whereby these drill frames are attached to the respective beams will now be set forth and as the attaching means for both is identical, a description of one, will suffice for both.

Each of the drill frames 14 and 15 includes a front cross bar 16 upon the upper side of which is mounted pivotally, a pair of longitudinally extending stub tongues 17 through the medium of the straps 18 secured on the sides thereof, by the transverse bolts 19 and having the eyes 20 on their lower ends projecting below the stub tongues 17 for connection with the eye bolts 21, which extend through the cross bars 16, for pivotally mounting the stub tongues on the drill frames.

The longitudinally extending rear end portion 22 of the bars 2 and 3 are pivotally connected on the upper side of the stub tongues 17 as at 23 and said longitudinal portion extends over said stub tongues to a point adjacent the rear ends thereof.

The rear end portions of the bars 2 and 3 are disposed in transversely extending guides (see Fig. 6), which are mounted rigidly on the stub tongues 17 and comprise a flat bar 25 upon the upper side of which is bolted a complemental bar having an intermediate raised portion 26 between which raised portion and the bar 25 the rear end of said bars 2 and 3 are disposed.

A blade 27 is secured to the lower side of the stub tongues 17 on each of the drill frames, and has its opposite ends anchored to the corresponding ends of the guide.

Forwardly of the stub tongues 17 the bars 2 and 3 have laterally extending threaded shanks 28 (see Fig. 7), on opposite sides to which are connected the coil springs 29 through the medium of the nuts 30 threaded on said shank.

The opposite ends of the coil springs 29 are secured to the connecting rods 31 which in turn are adjustably anchored to the opposite end portions of the cross beams 16 through the medium of apertured ears 32 through which said connecting rods extend, and have threaded thereon the retaining nuts 33.

As will be obvious, by threading the nuts 33 longitudinally on the outer ends of the connecting rods 31, the tension of the coiled springs 29, may be regulated. A pair of rearwardly diverging flexible braces 34 have their opposite ends anchored to the forward portion of the stub tongue 17, and to the cross members 16 of the drill frame.

In the use of the invention, the draw bar 5 may be positioned at any angle with respect to the hitch to adapt the device to varying planting conditions, such as side hill planting. The drills are permitted to swing from side to side on the bars 2 and 3 by means of the pivotal connections 23 when irregularities or obstructions are met, but said drills will always be immediately returned to their proper position by the coil spring 29, as will be apparent.

The drills will further be permitted to rock in a vertical plane by reason of the pivotal connections provided by the eye bolts 21 and the straps 18 on the stub shafts 17.

It is believed that the many advantages of a tractor hitch constructed in accordance with this invention will be readily understood, and although the preferred embodiment of the invention is as illustrated and described, it is to be understood that changes in the details of construction will be had which will fall within the scope of the invention as claimed.

Having thus described my invention, what I claim as new is:—

A tractor hitch for grain drills comprising a pair of rearwardly diverging bars, a pair of tongues pivotally connected to the bars adjacent their rear ends in a manner to swing in a horizontal plane thereon, said tongues having their intermediate portions pivotally connected to the drill frames in a manner to swing in a vertical plane thereon, a transverse guide mounted on the rear portion of each tongue for the reception of the free end of the bars and coil springs having one end secured to the opposite sides of each of the bars at a point spaced from the pivotal connections with the tongues and opposite ends coupled to the drill frame for yieldingly maintaining the drills in longitudinal alinement with respect to the hitch.

In testimony whereof I affix my signature.

DALLAS J. HUGHES.